C. C. MINOR.
PHOTOGRAPHIC OBJECTIVE.
APPLICATION FILED MAY 26, 1910.
1,077,420.  Patented Nov. 4, 1913.
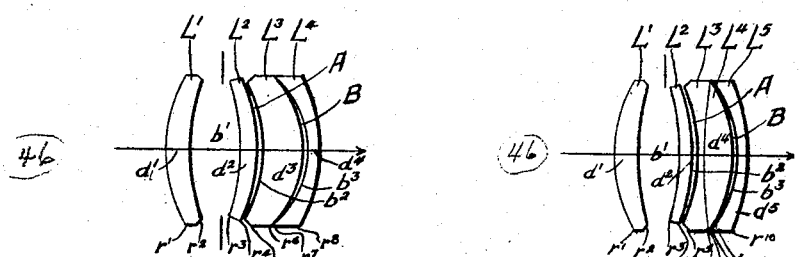
Fig. 1.
Fig. 2.
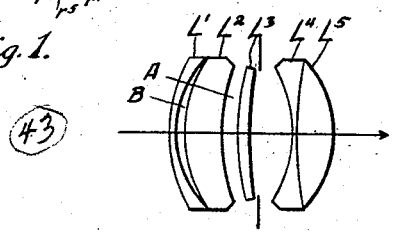
Fig. 3.
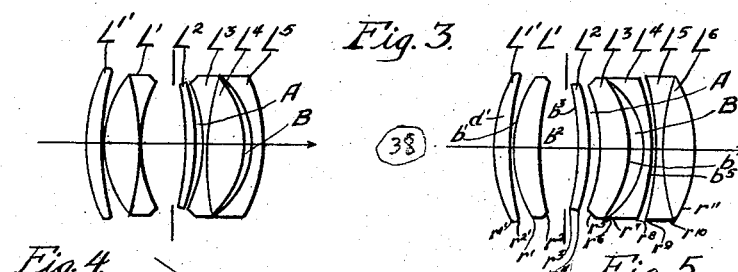
Fig. 4.
Fig. 5.
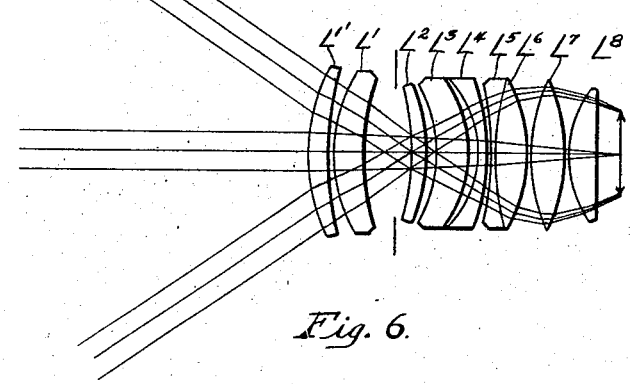
Fig. 6.
Witnesses:
Ephraim Banning
Inventor:
Charles Clayton Minor
By Attorneys

UNITED STATES PATENT OFFICE.

CHARLES CLAYTON MINOR, OF CHICAGO, ILLINOIS, ASSIGNOR OF ONE-EIGHTH TO WIRT F. SMITH AND ONE-FOURTH TO CHARLES L. JENNESS, BOTH OF CHICAGO, ILLINOIS.

PHOTOGRAPHIC OBJECTIVE.

1,077,420.   Specification of Letters Patent.   Patented Nov. 4, 1913.

Application filed May 26, 1910. Serial No. 563,595.

*To all whom it may concern:*

Be it known that I, CHARLES CLAYTON MINOR, a citizen of the United States, residing at Chicago, in the county of Cook and State of Illinois, have invented certain new and useful Improvements in Photographic Objectives, of which the following is a specification.

This invention relates to photographic objectives of the general class described in my application filed October 31, 1906, Serial No. 341,370.

One of the objects of this invention is the production of an improved photographic objective, corrected for spherical and chromatic aberration and having a field of considerable extent freed from astigmatism and coma.

Another object of the invention is the production of an objective, one of the parts of which is replaceable with another lens for the purpose of changing the focal length of the objective, the angle of covering power remaining unchanged.

A further object is the production of an objective of large aperture for use where there is an unusually scant amount of light, and which is capable of resolving in a high degree the details of fine lined objects.

In the accompanying drawings, Figures 1, 2 and 3 illustrate three photographic doublets embodying some of the features of my invention; Figs. 4, 5 and 6 illustrate the addition of one or more lenses to the lens system shown in Fig. 1, for the purpose of increasing the working aperture.

It has been found that by the use of at least three single lenses on one side of the diaphragm, having between them two air spaces of plus meniscus form, and one other lens of positive meniscus form on the other side of the diaphragm, spherical and other aberrations may be corrected to a greater extent than by the several means now employed. And by the successive additions of other single lenses of convex form to either or both components of the doublet (always securing at each addition a balance of optical corrections by introducing errors of a compensating nature in the lens system), greater and greater effective apertures may be realized, until finally apertures of 2 or F ½ or higher are gained.

While there already exist several types of photographic lenses which have two air spaces of plus meniscus form, as far as known, these lenses, being of the symmetrical type, necessarily have such air spaces located one on each side of the diaphragm space, thus assigning the effect of the glass surfaces which face these air spaces, to one and the same office. It was realized that if one of the air spaces could be assigned a specific duty, such as caring for spherical and chromatic aberration, such air space could be made especially effective in that capacity, for the accomplishment of very large relative apertures, provided the correction of astigmatism and curvature of field could otherwise be provided for, hence the use in the present invention of a similar air space, curved in the same direction as the other but unlike in relative surroundings, suited for correcting astigmatism and field curvature.

As is well known, air spaces lying between lens surfaces have a definite value, and as such constitute lenses of low refractive power, and are reckoned in with the optical constants of the glass composing the lenses on either side, according to the formula $$\frac{n\mathrm{D}-1}{r} + \frac{n\mathrm{D}'-1}{r'},$$

which formula, however, applies strictly to only a small region about the axis. In effecting the optical corrections, the air spaces are assigned definite values according to their respective functions, which depend upon whether the lens system is to be corrected for medium or high apertures.

The objective shown in Fig. 1 comprises a single front lens $L^1$ and a back combination consisting of lenses $L^2$, $L^3$ and $L^4$. The lenses $L^2$, $L^3$, and $L^4$ have between them two air spaces A and B. In Fig. 2 is shown a doublet, the front element of which consists of the lens $L^1$, the back combination comprising lenses $L^2$, $L^3$, $L^4$, and $L^5$. The lenses $L^3$ and $L^4$ are cemented for effecting more favorable spherical zones or correcting any outstanding chromatism. Between the lenses $L^2$ and $L^3$ is formed the air space A, and between the lenses $L^4$ and $L^5$ is the air space B, the form of the air spaces, however, being opposite in sign to their true value; for instance, if the form of the air space be convex or of the plus sign, its real value is minus (bearing relation to surface curves and kinds of glass for the lenses confining it, and having reference to the formula already given). The air space B serves to correct spherical and chromatic aberrations, while the purpose of the air space A is to eliminate astigmatism and curvature of field. Were it not for the air space A, the large aperture gained by virtue of the air space B would not be available for use, from the fact that the resulting image would be either curved or astigmatic or both. The effect of the facing surfaces forming air space A is to act compensatingly upon the two astigmatic picture surfaces, bringing them into coincidence, thus forming an anastigmatically-flattened field. For correcting low or medium aperture lenses, the value of the air space B as a negative unit sometimes approaches zero in the axial zone, while its integrity as a negative unit is still preserved, especially at the periphery where it serves to lengthen the focal rays that have been deflected too much toward the axis by the preceding lens or lenses in the system.

As already stated the effect of the component parts of the objective having a series of lenses confining between them air spaces of the form and relative position of air spaces A and B is to correct spherical and chromatic aberrations, astigmatism and field curvature. They also effect perfect correction for coma and orthoscopic distortion which errors virtually constitute all that are encountered in correcting an objective for photographic purposes. Thus in the one component lies the power to a remarkable degree of correcting all the errors entailed by the other component of the objective, and such office while realized in other unsymmetrical systems, has not as far as known been attempted in this novel manner and as such stands for the effective correcting of any other component lying on the other side of the diaphragm space which shall possess the positive errors, already mentioned.

The kinds of glass used in constructing an objective embodying my invention hardly have limitation. The refractive index for some of the convex meniscus lenses may range from about 1.46 to 1.61. Single lenses are so designed as to be substantially achromatic, but they may be further achromatized in the usual manner by adding a cemented dispersing lens, which may also serve to obtain more favorable spherical effects.

Another feature of this invention consists in the practicability of having the use of several perfectly corrected lens systems of differing focal lengths by merely replacing one of the single meniscus lenses with a similar lens of shorter or longer focal length. The underlying laws which make these changes possible are as follows: Increasing the refractive and dispersive power of a plus or collecting lens, or increasing its total amount of convexity, or increasing its thickness, necessarily results in the shortening of its focal length, and also in each case results in an increase of spherical and chromatic aberration, etc., of the positive sign; and an opposite change results in an increase of focal length and a decrease of such aberrations of the same sign. If, therefore, it be desired to project the calculations for a lens system of less focal length than any particular one already worked out under these principles, and still maintain the integrity of its optical corrections throughout, it may be accomplished in three different ways by treating with one of the single meniscus lenses: First, by increasing its total convexity; second, by increasing the refractive index of said lens; or, third, by both operations while at the same time in each case somewhat decreasing its thickness. As may readily be seen, this also results in the increased working aperture of the lens, through the possible realization of the sine condition, provided this single correcting lens has been made sufficiently thick and of low dispersive and refractive power in the beginning, as to have incorporated within itself a proper amount of spherical and chromatic aberration of the positive sign to balance a comparatively large amount of these aberrations, but of the negative sign, which would ensue as a result of having the air space B of sufficient axial thickness. As considerable latitude may be embraced in extremes of equivalent focal lengths, by these operations, four or even more focal lengths of convenient proportions may be chosen for a series of lens systems of any given diameter, still preserving in each nearly the same angle of covering power. Then, as to maintaining the corrections for curvature of field and astigmatism, it will be stated that to the degree this single correcting lens is given a more or less decided meniscus form, is the field flattened or curved, and, generally speaking, other things being equal, astigmatism corrections will also follow or remain favorable. So far as linear distortion is concerned, if the foci of the front and rear combinations of the objective have been adjusted in relation to each other for a perfectly rectilinear effect, no appreciable change will take place in this respect by the foregoing modifications of focal lengths, the systems in each case remaining orthoscopic.

As limitations for high apertures for lenses of four or five elements, under the principles here stated, reach about the ratio of .3, recourse is had to using one other single lens $L^{1\prime}$ of plus meniscus form, placed at the outer end of the lens system as illustrated in Fig. 4. Such addition necessarily introduces a certain amount of positive aberrations, which must be neutralized by the introduction of a corresponding amount of the same aberrations, but of the negative sign, and, as previously stated, this neutralization is effected by giving the air space B greater axial thickness; that is, increasing its negative value, the limit of effective aperture in this case being about .5 or F 2. In a case where the meniscus lens L' is made decidedly thick, its positive or plus characteristic apparently disappears, and if a dispersing lens of high refractive power becomes a cemented portion of such lens, its resulting focal power, taken as a whole, may amount substantially to a dispersing lens, while it is in exterior form actually thicker in the center than at its margins. For a still further increase in aperture, a meniscus lens is placed near to the outer lens of the other combination (Fig. 5), and like procedure of the foregoing for the balancing of the corrections, is gone through with and further aperture-increase realized, amounting to about .8 or F 1.3. Still further aperture-increase is accomplished by the addition of two lenses $L^7$ and $L^8$ (Fig. 6), $L^7$ being a double convex and $L^8$ a nearly plano-convex lens. These two additions, when placed as shown in Fig. 6, retain, with the balance of the system, a perfectly rectilinear picture image. These combined additions result in an aperture of 2 or F ½. As it is well known that a series of convex lenses of these shapes have a strong tendency toward self-correction, when placed as above described, it is therefore practicable, by a judicious choice of glass, to make these added elements nearly achromatic in their relation to the whole system, so that by the removal of the last one or two additions the balance of the system will still have the sine condition fulfilled; that is, it will be aplanatic.

Examples of the improved objective are given below. Like symbols for radii of spherical surfaces, axial thicknesses of glass, air spaces, etc., obtain for all different figures.

*First Example, shown in Fig. 1.*

Radius in millimeters.

$r^1 = +32.$
$r^2 = +46.1$
$r^3 = -60.$
$r^4 = -39.5$
$r^5 = -35.1$
$r^6 = -24.8$
$r^7 = -22.7$
$r^8 = -39.$

Thickness of lenses and air spaces.

$d^1$ for $L^1$ = 4.77 millimeters.
$b^1$ for diaphragm space = 11 millimeters.
$d^2$ for $L^2$ = 3.75 "
$b^2$ for air space A = 1.05 "
$d^3$ for $L^3$ = 7.50 "
$b^3$ for air space B = .25 "
$d^4$ for $L^4$ = .90 "

Kinds of glass.

| | $L^1$ | $L^2$ | $L^3$ | $L^4$ |
|---|---|---|---|---|
| $n^C$: | 1.6088 | 1.57046 | 1.6088 | 1.56286 |
| $n^D$: | 1.6120 | 1.5734 | 1.6120 | 1.5662 |
| $n^F$: | 1.61963 | 1.58047 | 1.61963 | 1.57435 |

Focal distance 115 millimeters; diameter of largest lens 32 millimeters; effective aperture .25; angle of view about 80°; anastigmatically-flattened field about 55°.

*Second Example, shown in Fig. 2.*

For low or medium aperture the values for the air spaces A and B are as given below. The lenses $L^3$ and $L^4$ are cemented, for the purpose of gaining more favorable chromatic and spherical corrections.

Radius in millimeters.

$r^1 = 37.$
$r^2 = 29.$
$r^3 = -43.$
$r^4 = -31.$
$r^5 = -25.5$
$r^6 = +$
$r^7 = +$
$r^8 = -18.4$
$r^9 = -17.$
$r^{10} = -30.5$

Thickness of lenses and air spaces.

$d^1$ for $L^1$ = 6.22 millimeters.
$b^1$ diaphragm space = 9.00 millimeters.
$d^2$ for $L^2$ = 2.18 "
$b^2$ for air space A = .45 "
$d^3$ for $L^3$ = .38 "
$d^4$ for $L^4$ = 6.05 "
$b^3$ for air space B = .15 "
$d^5$ for $L^5$ = .68 "

Kinds of glass.

| | $L^1$ | $L^2$ | $L^3$ | $L^4$ | $L^5$ |
|---|---|---|---|---|---|
| $n^C$: | 1.51456 | 1.57046 | 1.56286 | 1.6088 | 1.56286 |
| $n^D$: | 1.51708 | 1.5734 | 1.5662 | 1.6120 | 1.5662 |
| $n^F$: | 1.52305 | 1.58047 | 1.57435 | 1.61963 | 1.57435 |

Focal distance 130 millimeters; diameter of largest lens 25 millimeters; effective aperture .16; angle of view about 90°; anastigmatically-flattened field about 80°. For the single lens to replace lens $L^1$ for the purpose of shortening the lens system and increasing the working aperture: $L^{1'}$ $r = 27.5$ millimeters, $L^{1'}$ $r' = 41$ millimeters, $D = 3$ millimeters; kinds of glass $L^{1'}$ $n^C$ 1.6088, $n^D$ 1.6120, $n^F$ 1.61963; diameter of largest lens 25 millimeters. Focal distance shortened to 100 millimeters; effective aperture .22; angle of view about 80°; anastigmatically-flattened field about 75°.

*Third Example, shown in Fig. 5.*

Two additional meniscus convex lenses placed one at each outer end of the two combinations for the purpose of securing increased working aperture.

Radius in millimeters.

$r^{1'} = 39$
$r^{2'} = 70$
$r^1 = 30.08$
$r^2 = 45.06$
$r^3 = -60.$
$r^4 = -39.$
$r^5 = -35.5$
$r^6 = -24.5$
$r^7 = -16.55$
$r^8 = -25.5$
$r^9 = -60.08$
$r^{10} = +39.2$
$r^{11} = -27.$

Thickness of lenses and air spaces.

$d^{1'}$ for $L^{1'}$ = 2.80 millimeters.
$b^{1'}$ for air space = 4. "
$d^1$ for $L$ = 5.75 "
$b^2$ diaphragm space = 8. "
$d^2$ for $L^2$ = 3.40 "
$b^3$ for air space A = 2.75 "
$d^3$ for $L^3$ = 7.75 "
$b^4$ for air space B = 2.35 "
$d^4$ for $L^4$ = 1.55 "
$b^5$ for air space = .2 "
$d^5$ for $L^5$ = 2.25 "
$d^6$ for $L^6$ = 7.50 "

Kinds of glass.

| | $L^{1'}, L^1, L^2, L^3$ | $L^4$ | $L^5$ | $L^6$ |
|---|---|---|---|---|
| $n^C$: | 1.6088 | 1.56286 | 1.53340 | 1.6088 |
| $n^D$: | 1.6120 | 1.5662 | 1.53644 | 1.6120 |
| $n^F$: | 1.61963 | 1.57435 | 1.54383 | 1.61963 |

Diameter of largest lens 34 millimeters; mean focal distance 41 millimeters; effective aperture .8; angle of view 60°; anastigmatically-flattened field 48°. It was found well for several reasons to achromatize $L^5$ to a somewhat greater extent by an additional dispersing lens $L^5$ cementing them together.

*Fourth Example, shown in Fig. 6.*

For this construction the formula as found in the third example may be used, adding two other convex lenses placed close to the last lens ($L^6$ Fig. 5), thereby causing the rays to converge sharply and focus close to the last lens in the system, as indicated by the one axial pencil and two marginal pencils of light traced in the drawing.

| Radius in millimeters. | Thickness of lenses and air spaces. |
|---|---|
| $r^{12}=+24.$ | $b$ for air space$=$ .2 millimeters. |
| $r^{13}=-40.$ | $d^7$ for $L^7=$ 8.5 " |
| $r^{14}=+17.$ | $b^1$ for air space$=$ .2 " |
| $r^{15}=+70.$ | $d^8$ for $L^8=$ 9. " |

The mean focal distance of this combination is about 16 millimeters; aperture 2 or F ½; angle of view nearly equal to example 4; anastigmatically-flattened field about 45°; and showing rectilinear lines to margins.

I claim:

1. A spherically, chromatically and astigmatically corrected photographic doublet, one of the components of which comprises a plurality of lenses separated by air spaces of plus meniscus form curved in the same direction.

2. A spherically, chromatically and astigmatically corrected photographic doublet, one of the components of which comprises a plurality of lenses separated by air spaces, curved in the same direction and of like sign, one of said air spaces serving to correct spherical and chromatic aberration, and another of said air spaces serving to eliminate astigmatism and curvature of field.

3. A spherically and chromatically corrected photographic objective, having a large and flattened field, freed from coma and astigmatism, consisting of a plurality of lenses located on one side of the diaphragm, having between them air spaces of plus meniscus form, and a lens of plus meniscus form on the other side of the diaphragm.

4. In an unsymmetrical photographic objective for widely varying apertures, in combination, a lens of plus meniscus form on one side of the diaphragm, and a plurality of lenses on the other side of the diaphragm, said last mentioned lenses having between them consecutive air spaces of plus meniscus form.

5. In an unsymmetrical photographic objective for high apertures, in combination, a lens of plus meniscus form on one side of the diaphragm, and a plurality of lenses on the other side of the diaphragm, said last mentioned lenses having between them consecutive air spaces of plus meniscus form, and a lens of plus meniscus form placed at the end of either combination.

6. In an unsymmetrical photographic objective for high apertures, in combination, a lens of plus meniscus form on one side of the diaphragm, and a plurality of lenses on the other side of the diaphragm, said last mentioned lenses having between them consecutive air spaces of plus meniscus form, a lens of plus meniscus form placed in front of and close to the first mentioned lens, and a lens of plus meniscus form placed near the outer lens at the opposite side of the diaphragm.

7. In an unsymmetrical photographic objective for high apertures, in combination, a lens of plus meniscus form on one side of the diaphragm, and a plurality of lenses on the other, and having between them consecutive air spaces of plus meniscus form, a lens of plus meniscus form placed in front of and close to the first mentioned lens, a lens of plus meniscus form placed near the outer lens at the opposite side of the diaphragm, and two other lenses of convex form, placed near to the last mentioned lens, the one being last added having a nearly plane surface and turned outward.

8. A lens system, one component of which is a cemented and achromatized meniscus lens, the other component consisting of a plurality of lenses, forming between them two air spaces of plus meniscus form curved in the same direction.

9. A photographic objective, one component of which comprises a lens of plus meniscus form, and the other of which consists of a plurality of lenses having two pairs of facing surfaces, both pairs of which are of negative value.

10. A photographic objective, one component of which comprises a lens of plus meniscus form, and the other of which consists of a plurality of lenses having two pairs of facing surfaces, the radii of such facing surfaces being different and the power of each of said pairs of facing surfaces being of negative value.

11. A lens system, one component of which is a cemented and achromatized meniscus lens, and the other of which consists of a plurality of lenses forming between them two air spaces of plus meniscus form.

CHARLES CLAYTON MINOR.

Witnesses:
WALKER BANNING,
WM. P. BOND.